United States Patent [19]

Fazekas

[11] Patent Number: 4,525,045
[45] Date of Patent: Jun. 25, 1985

[54] CAMERA FOR THREE-DIMENSIONAL MOVIES

[75] Inventor: Carl F. Fazekas, Tarzana, Calif.

[73] Assignee: Panavision, Inc., Tarzana, Calif.

[21] Appl. No.: 573,085

[22] Filed: Jan. 23, 1984

[51] Int. Cl.³ .............................................. G03B 35/00
[52] U.S. Cl. ......................................... 352/57; 352/65
[58] Field of Search ........................ 352/57, 60, 62, 65

[56] References Cited

U.S. PATENT DOCUMENTS

| | | | |
|---|---|---|---|
| 2,235,743 | 3/1941 | Gagliardi | 352/60 |
| 2,329,294 | 9/1943 | Ramsdell | 88/16.6 |
| 3,143,032 | 8/1964 | Cednäs | 88/16.6 |
| 3,189,915 | 6/1965 | Tondreau | 352/60 |
| 3,339,998 | 9/1967 | Hoch | 352/239 |
| 3,363,966 | 1/1968 | Hoch | 352/65 |
| 3,851,955 | 12/1974 | Kent et al. | 352/60 |
| 3,990,087 | 11/1976 | Marks et al. | 354/117 |
| 4,017,166 | 4/1977 | Kent et al. | 352/57 |

FOREIGN PATENT DOCUMENTS 237349 7/1925 United Kingdom ................ 352/57
1021235 3/1966 United Kingdom ................ 352/57

Primary Examiner—Monroe H. Hayes
Attorney, Agent, or Firm—Lyon & Lyon

[57] ABSTRACT

A lens system is provided for being coupled to a camera. The lens system has two prime lenses for receiving light from objects being filmed. Light passing through the prime lenses is reflected by a pair of prisms and a pair of mirrors to a relay lens. Light from the relay lens is used to expose the film in a conventional movie camera so that the image from one prime lens is recorded above the image from the other prime lens. Each film frame is divided in half, one half storing the image recorded by one prime lens, the other half storing the image recorded by the other prime lens. The two prime lenses are displaced both vertically and horizontally. As the two prime lenses are focused by being moved horizontally, one of the prime lenses moves vertically to insure that the object being focused on appears at the same height within its half frame as the object appears in the half frame storing the image from the other prime lens.

25 Claims, 8 Drawing Figures

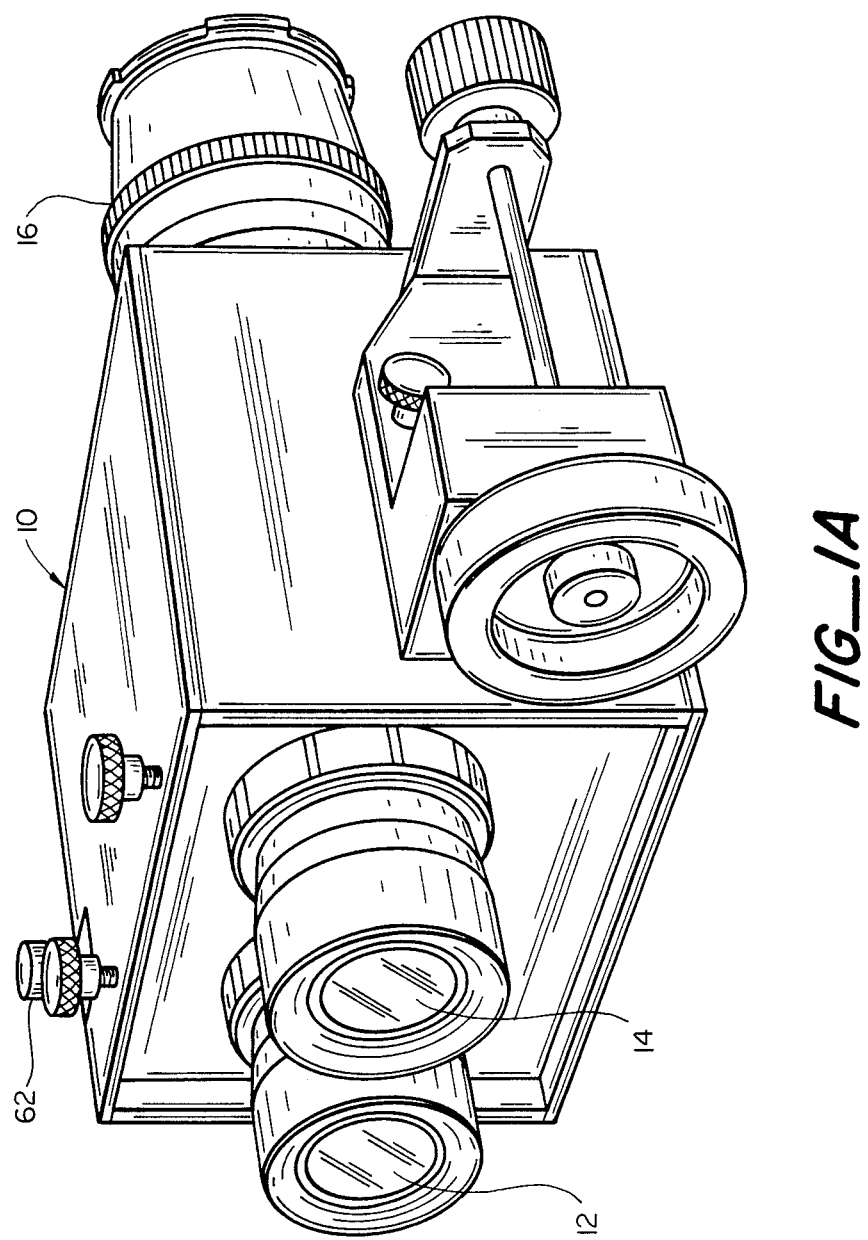
FIG_1A

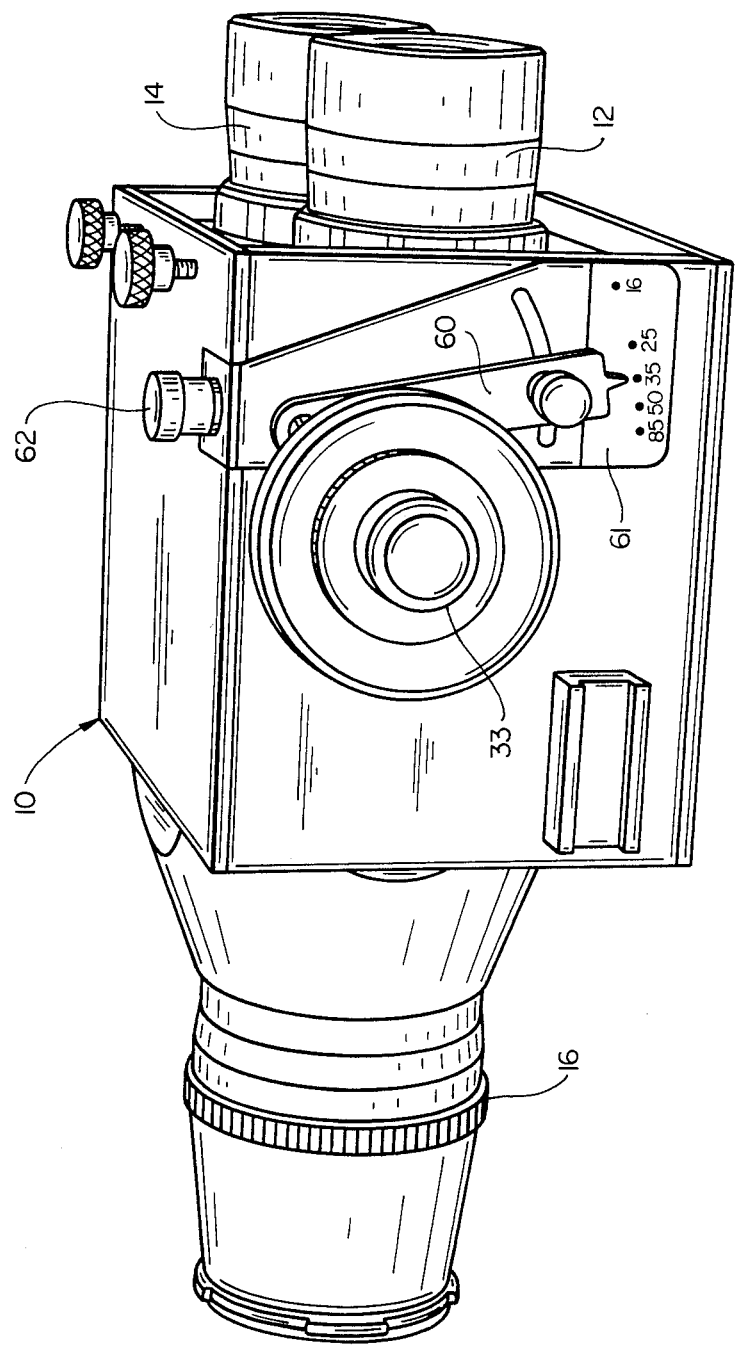
FIG_1B

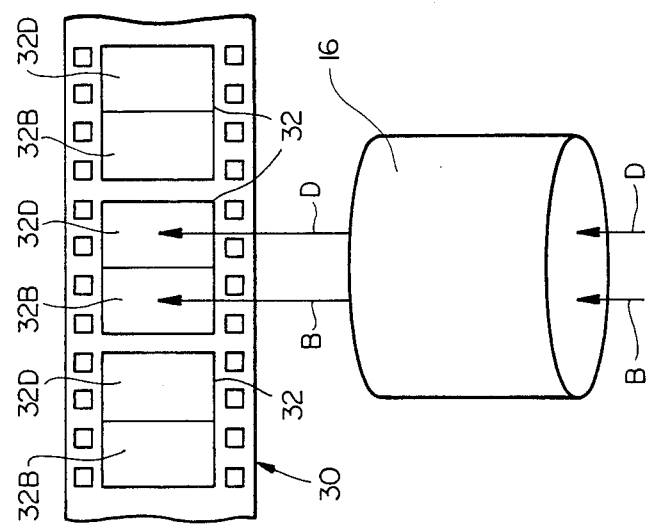
FIG_3
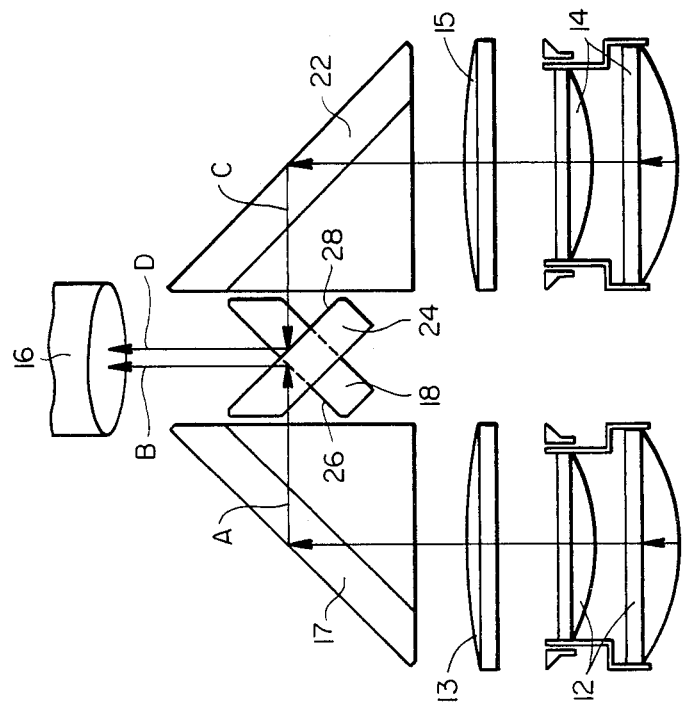
FIG_2

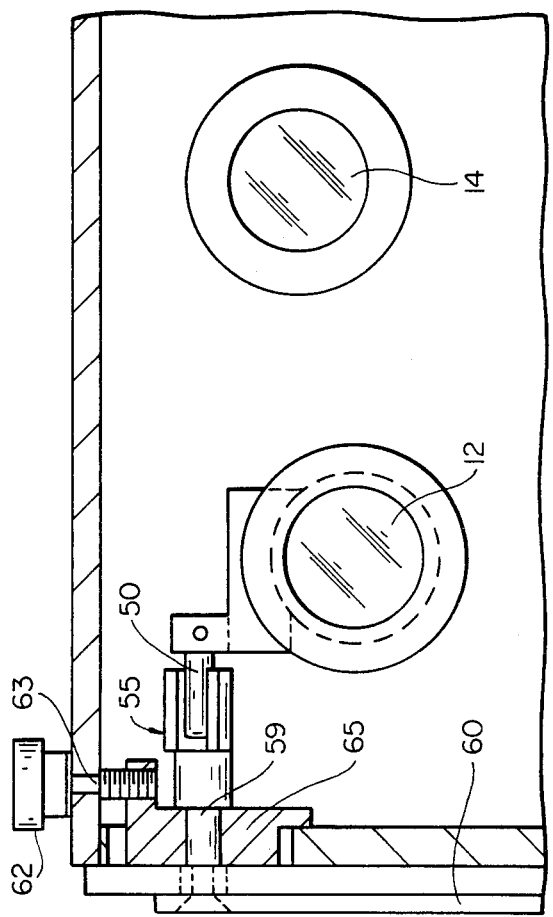
FIG_4
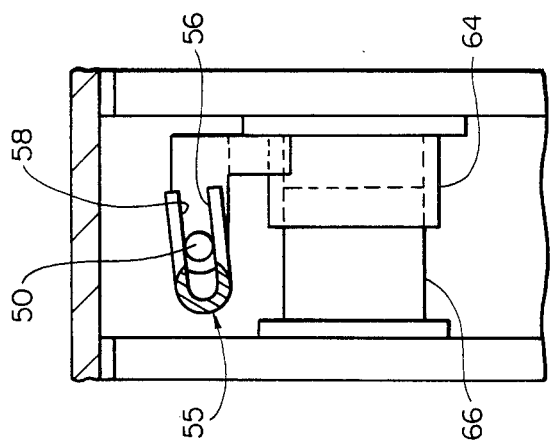
FIG_5

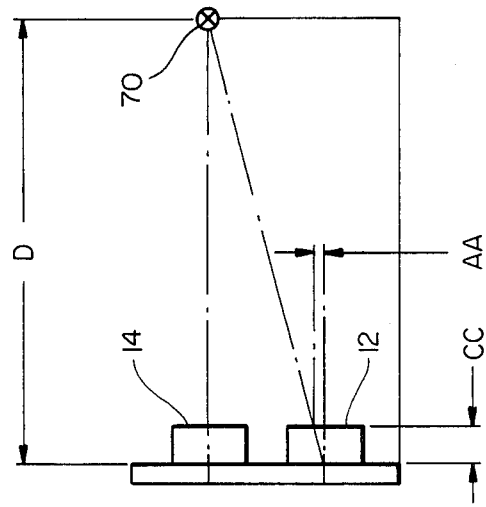
FIG_7
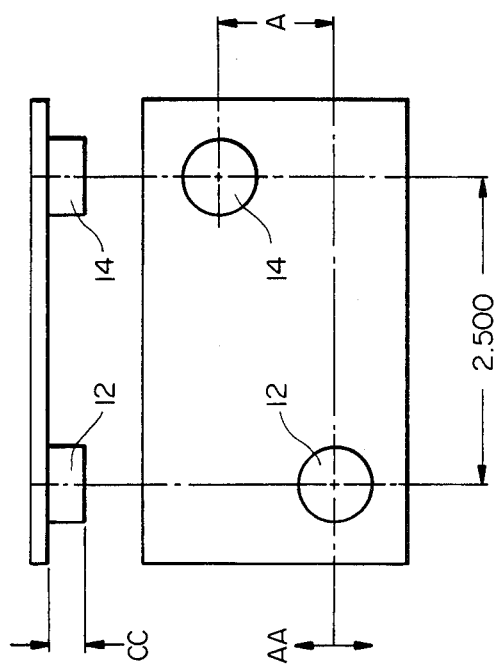
FIG_6

4,525,045

CAMERA FOR THREE-DIMENSIONAL MOVIES

BACKGROUND OF THE INVENTION

This invention relates to cameras for making motion pictures, and more specifically, to cameras for making motion pictures with a "3-D" effect.

It is known in the art to make motion pictures that generate a 3-D effect by using two lenses. An example of a motion picture camera for accomplishing this effect is illustrated in U.S. Pat. No. 3,363,966, issued to W. C. Hoch. The camera illustrated therein contains a left lens and a right lens sitting side by side for recording an image on film. A set of prisms shifts the image from the left lens both upwardly and to the right, while a second set of prisms shifts the image from the right lens both downwardly and to the left. In this way, images from the right lens and images from the left lens are recorded over vertically separated parts of the film being exposed.

In accordance with the prior art, the right lens and the left lens are horizontally spaced about 2.5 inches from each other. When the film is projected, a special projection lens apparatus, used in conjunction with a special pair of glasses, permits the right eye of the viewer to see the image recorded by the right lens, while the left eye of the viewer sees the image recorded by the left lens. In this way, the viewer receives various "visual cues" that appear to the viewer as three-dimensional effects. This is because the image that the right eye receives is slightly different from the image that the left eye receives.

When a viewer perceives a normal three-dimensional object, the image that the right eye receives is also slightly different from the image that the left eye receives. This is because the right eye of an average person is 2.5 inches from the left eye of that person. By recording images of objects with lenses that are 2.5 inches apart, and presenting these images to each eye individually, a camera enhances the realism that the viewer experiences by duplicating the visual cues that the viewer would receive if he were looking at the actual object filmed.

SUMMARY OF THE INVENTION

A "three-dimensional" lens system is provided for recording images onto film. The lens system includes a left taking or prime lens and a right prime lens for receiving light from an object. The optical axes of the two lenses are parallel, but the lenses are displaced both horizontally and vertically. The reason for displacing the lenses horizontally is to match the interocular distance of an average viewer (approximately 2.5 inches). The reason for displacing the lenses vertically is to facilitate the shifting of the image recorded from the right lens to the left, and to facilitate the shifting of the image recorded from the left lens to the right. This permits the shifted images to be recorded on the film without requiring the images to be shifted in an upward or a downward direction. Therefore, the left image is recorded on one half of the "picture frame," the right image is recorded on the other half of the picture frame, and there is no overlap. The leftward and rightward shifting is done with a mirror and a prism, such as an amici prism.

It is desirable to insure that the viewer does not detect the fact that the left and right lenses are vertically displaced from one another. This is because if the left eye perceives objects at a first height and the right eye perceives the same objects at a different height, the image will appear distorted. Accordingly, it is desirable that both images be positioned at the same height in their respective portions of the picture frame. To adjust for this, the lower lens is moveable in the vertical direction. A manual "horizon adjust" knob is provided to make this adjustment. In this way, the cameraman can adjust the lower lens so that an object at the horizon (i.e. a great distance from the camera) appears at the exact height in the lower frame as the same object appears in the upper frame.

It has been discovered that filming objects closer to the camera requires that the height of the lower lens be adjusted as a function of distance from the camera. A cam follower is provided that causes the height of the lower lens to be adjusted as the camera is focused on closer objects without requiring a separate adjustment. In this way, when the cameraman desires to focus in on a closer object, he need not reset the height of the lower lens, since the vertical height of the lower lens is changed automatically when he refocuses the camera.

BRIEF DESCRIPTION OF THE DRAWINGS

FIGS. 1a is a left front view of a lens system adapted to be coupled to a camera in accordance with a preferred embodiment of the present invention.

FIG. 1b is a right view of the lens system of FIG. 1a.

FIG. 2 is a top cut-away view of the lens system of FIGS. 1a and 1b.

FIG. 3 an illustration of a piece of film in a conventional camera exposed to light from the lens system.

FIG. 4 is a front cut-away view of the lens system.

FIG. 5 is a side cut-away view of the lens system.

FIG. 6 is a sketch of the two prime lenses illustrating vertical and horizontal displacement.

FIG. 7 is a sketch of the vertically moveable lens focusing on an object.

DETAILED DESCRIPTION OF THE PREFERRED EMBODIMENT

Referring to FIGS. 1a and 1b, a lens system 10 adapted to be coupled to a conventional film camera, such as a camera adapted to record images on 35 mm film, includes a movable prime lens 12 and a fixed prime lens 14. Fixed prime lens 14 and moveable prime lens 12 can be moved forward or backward when a cameraman focuses the lens system on closer or more distant objects. As described below, a pair of amici prisms and mirrors internal to lens system 10 reflects the light received by fixed prime lens 14 and moveable prime lens 12 to enable a relay lens 16 to receive the light and present it to the camera.

Referring now to FIG. 2, a top view of the interior of the lens system of FIGS. 1a and 1b is illustrated. Moveable prime lens 12 is provided to receive light from an object. Light received by moveable prime lens 12 passes through a field lens 13, which is used to focus the image received by prime lens 12. The light which passes through field lens 13 then strikes an amici prism 17, which is provided to reflect the light in a direction indicated by arrow A. The light reflected by amici prism 17 then strikes a mirror 18, which reflects it in a direction indicated by arrow B. The light then passes through relay lens 16 and onto film 30 (FIG. 3).

Similarly, light from fixed prime lens 14 passes through a field lens 15 and strikes an amici prism 22, which reflects it along a direction indicated by arrow C. The light reflected by amici prism 22 then strokes a mirror 24, which reflects it in a direction indicated by arrow D. The light reflected by mirror 24, which is located above mirror 18, then passes through relay lens 16 and onto film 30 (FIG. 3). Thus, both images are focused onto the film.

As described above, moveable prime lens 12, prism 17, and mirror 18 are vertically displaced from fixed prime lens 14, prism 22, and mirror 24, respectively. More specifically, moveable prime lens 12 is lower than fixed prime lens 14. Therefore, the rays of light constituting the image received by moveable prime lens 12 and reflected by prism 17 are lower than the rays of light received by fixed prime lens 14 and reflected by prism 22. Mirror 18 is thus placed in a fixed position below mirror 24. A surface 26 of mirror 18 and a surface 28 of mirror 24 define the perimeter of the image presented to relay lens 16. Therefore, regardless of the vertical motion of moveable prime lens 12, and the attendant vertical motion of the image received by moveable prime lens 12, the perimeter or frame of that image received by relay lens 16 does not move vertically.

Referring to FIGS. 2 and 3, image B reflected by mirror 18 is presented to relay lens 16 along with image D reflected by mirror 24. Images B and D are transmitted from relay lens 16 inside lens system 10 to conventional camera film 30 within a conventional camera housing. Camera film 30 is periodically exposed to the light provided by relay lens 16 via a conventional shutter mechanism (not shown). Therefore, each frame 32 of the film 30 is of a conventional size (approximately 0.870" by 0.735"), but each frame is split vertically into a portion 32B and a portion 32D, corresponding to the images received by prime lenses 12 and 14, and reflected by mirrors 18 and 24 respectively.

In this way, it is possible to receive light from two lenses and record them on a single piece of film 30 without requiring any optical device that reflects the light in a vertical direction. All that is required is to reflect the light in a horizontal direction, thus simplifying the optical system. At a later time, the image recorded on film 30 can be projected, via a well-known technique, to a viewer such that the image from moveable prime lens 12 is seen by the viewer's right eye, and the image from fixed prime lens 14 is seen by the viewer's left eye. For example, U.S. Pat. No. 3,189,915, issued to Albert W. Tondreau, teaches apparatus for projecting stereoscopic images onto a screen. This causes the viewer to perceive a three-dimensional effect. This is because the image that the right eye sees was recorded by a lens horizontally displaced by approximately 2.5 inches from the lens that recorded the image that the left eye sees. Further modifications of this effect are possible by altering the horizontal displacement of lenses 12 and 14 via a convergence adjust knob 33 (FIG. 1b). When convergence adjust knob 33 is turned, the horizontal displacement of lenses 12 and 14 changes. This can be used to create the effect of having an object appear to be closer to the viewer.

However, as previously discussed, prime lenses 12 and 14 are also vertically displaced, and if the viewer's left and right eyes perceive images that are vertically displaced, that creates an undesired visual effect. It is therefore desirable to compensate for that effect. The desired degree of compensation is related to the focal length of prime lenses 12 and 14, and the distance between the object being filmed and lens system 10.

FIGS. 4 and 5 illustrate prime lenses 12 and 14 in cut-away drawing. Lens 12 is placed in a prime lens housing 64, while field lens 13 is placed in a field lens housing 66. Field lens housing 66 telescopes into prime lens housing 64. Prime lens housing 64 is rigidly affixed to a cam follower or pin 50 which rides in a cam or guide 55. Guide 55 is attached to lens system 10 in a manner described below. As seen in FIG. 5, guide 55 is U-shaped, and pin 50 rides on the inside surface of the guide. Guide 55 has a flat lower inside surface 56 and a flat upper inside surface 58. As lens 12 moves backward, i.e. towards field lens 13, pin 50 is pushed down by inside surface 58, and as lens 12 moves forward, i.e. away from field lens 13, pin 50 is pushed up by inside surface 56. Therefore, the vertical displacement caused by moving lens 12 forward is determined by the slope of surfaces 56 and 58 of guide 55. Because field lens housing 66 telescopes into prime lens housing 64, it can be seen that as moveable prime lens 12 moves vertically, field lens 13 will also move vertically. The slope of surface 56 and 58 of guide 55 can be adjusted by moving a manual control arm 60 (see FIG. 1b). Specifically, guide 55 is rigidly affixed to manual control arm 60 via an extension member 59, so that when a cameraman changes the slope of arm 60, the slope of inside surfaces 56 and 58 of guide 55 changes. On the surface of lens system 10 is a plate 61, which indicates which direction manual control arm 60 should point in for various focal lengths of prime lens 12.

In addition, guide 55 can be moved vertically without altering the slope of surfaces 56 and 58 by moving a horizon adjust knob 62. Horizon adjust knob 62 is affixed to a threaded shaft 63, which runs through a block 65. As knob 62 is manually rotated, shaft 63 rotates, and block 65 rides on the threads of shaft 63 in a vertical direction. Extension member 59 runs through block 65. Therefore, as extension block 65 moves vertically, extension member 59 moves vertically, and guide 55 affixed to extension member 59 moves vertically. Therefore, horizon adjust knob 62 can be used to independently move guide 55 in a vertical direction.

In use, the cameraman typically will first select a pair of matched lenses for insertion into the housings provided for lenses 12 and 14. The cameraman will then select the slope for surfaces 56 and 58 by setting manual control arm 60 so that it points to the point on the scale on plate 61 corresponding to the focal length of lenses 12 and 14. Guide 55 is therefore rotated so that the slope of surfaces 56 and 58 is appropriate for the focal length of lenses 12 and 14. Thus, the cameraman's determination of slope is dependent on the focal length of lenses 12 and 14. Then the cameraman will focus on an object, and determine the height the object resides on half-frames 32B and 32D. An object located at any distance suffices for this purpose. The cameraman will then adjust the horizon adjust knob 62 to cause the object to appear at the same height in half-frame 32B as it does in half-frame 32D. (Typically, the cameraman must adjust the horizon adjust knob 62 every time he changes the lenses 12 and 14). When the cameraman is done doing that, he then focuses on an object that he is interested in filming, and guide 55 will position lens 12 vertically. This causes the image of the object being filmed to automatically appear at the same height on half-frame 32B as it appears on half-frame 32D.

Referring now to FIG. 6, distance CC is defined as the horizontal component of the distance from the position of lens 12 to a position lens 12 would be if focused on an object at infinity (i.e. at the horizon). Distance A is defined as the vertical distance between lens 12 and 14. Table I below provides appropriate displacements CC and changes in displacement A for various lens focal lengths as a function of distance from the object being filmed.

The distances illustrated in FIG. 7 are referenced with regards to the following equations describing the relationship between vertical displacement, focal length, and distance of an object 70 being filmed. Where
D = Distance between the camera and an object,
M = Magnification,
f = focal length in inches,
according to the lens extension formula $$D = f(2 + M + 1/M)$$

The horizontal distance the lens moves to focus on the object is $$CC = f/M$$

and the vertical distance that lens 12 must move is $$AA = 0.3675(CC + f)/D$$

TABLE I

| DISTANCE (FEET) | 18 MM | | 25 MM | | 35 MM | | 50 MM | | 85 MM | |
|---|---|---|---|---|---|---|---|---|---|---|
| | AA | CC | AA | CC | AA | CC | AA | CC | AA | CC |
| 2 | .0112 | .0223 | .0157 | .0441 | .0225 | .0898 | .0331 | .1950 | .0616 | .6733 |
| 2.5 | .0089 | .0176 | .0125 | .0346 | .0177 | .0699 | .0259 | .1496 | .0470 | .4908 |
| 3 | .0074 | .0145 | .0103 | .0285 | .0147 | .0572 | .0213 | .1213 | .0381 | .3872 |
| 4 | .0055 | .0108 | .0077 | .0211 | .0109 | .0420 | .0157 | .0881 | .0277 | .2729 |
| 5 | .0044 | .0086 | .0061 | .0167 | .0086 | .0332 | .0125 | .0692 | .0218 | .2109 |
| 6 | .0037 | .0071 | .0051 | .0138 | .0072 | .0274 | .0103 | .0570 | .0180 | .1719 |
| 7 | .0031 | .0061 | .0044 | .0188 | .0061 | .0234 | .0088 | .0484 | .0153 | .1451 |
| 8 | .0027 | .0053 | .0038 | .0103 | .0054 | .0204 | .0077 | .0421 | .0133 | .1256 |
| 9 | .0024 | .0047 | .0034 | .0091 | .0048 | .0180 | .0068 | .0373 | .0118 | .1107 |
| 10 | .0022 | .0042 | .0030 | .0082 | .0043 | .0162 | .0061 | .0334 | .0106 | .0989 |
| 12 | .0018 | .0035 | .0025 | .0068 | .0036 | .0134 | .0051 | .0277 | .0087 | .0816 |
| 14 | .0016 | .0030 | .0022 | .0058 | .0030 | .0115 | .0044 | .0236 | .0075 | .0695 |
| 16 | .0014 | .0026 | .0019 | .0051 | .0027 | .0100 | .0038 | .0206 | .0065 | .0605 |
| 18 | .0012 | .0023 | .0017 | .0045 | .0024 | .0089 | .0034 | .0183 | .0058 | .0535 |
| 20 | .0011 | .0021 | .0015 | .0041 | .0021 | .0080 | .0030 | .0164 | .0052 | .0480 |
| 22 | .0010 | .0019 | .0014 | .0037 | .0019 | .0073 | .0028 | .0149 | .0047 | .0435 |
| 30 | .0007 | .0014 | .0010 | .0027 | .0014 | .0053 | .0020 | .0109 | .0034 | .0317 |
| 60 | .0004 | .0007 | .0005 | .0013 | .0007 | .0026 | .0010 | .0054 | .0017 | .0157 |
| Infinity | 0 | 0 | 0 | 0 | 0 | 0 | 0 | 0 | 0 | 0 |

The number 0.3675 is used because the distance between the centers of portion 32B and 32D is 0.3675 inches.

For an example, assume one wishes to use a 35 mm lens at ten feet (120 inches) to film an object. Using the lens extension formula, $$120'' = 35 \text{ mm} \times (1''/25.4 \text{ mm}) \times (2 + M + 1/M)$$

Using the quadratic formula to solve for M.

$$M = 85.07395982$$
$$CC = f/M = (35/25.4)/85.07395982$$
$$= .016197116 \text{ inches}$$
$$AA = (CC + f) \times .3675/120$$
$$= .004269584 \text{ inches (or .0043 as appears in Table I.)}$$

As described above, it has been found that instead of calculating the vertical displacement for each object being filmed, setting guide 55 to a particular position will cause lens 12 to move appropriately along a vertical axis as the cameraman focuses the camera. More specifically, surfaces 56 and 58 of guide 55 should be tilted at the following angles:

| Lens Focal Length | Slope |
|---|---|
| 18 MM | 27° 5' |
| 25 MM | 20° 6' |
| 35 MM | 14° 41' |
| 50 MM | 10° 14' |
| 85 MM | 5° 57' |

It is noted that lens 12 must be able to move along three axes without permitting stray light to enter the housing of lens system 10. This is accomplished by constructing lens system 10 so that prime lens housing 64 and field lens housing 66 ride in a set of dual dovetail tracks.

While the invention has been particularly taught and described with reference to the preferred embodiments, those versed in the art will appreciate that minor modifications in form and detail may be made without departing from the spirit and scope of the invention. For instance, the invention could be used in conjunction with a still camera as well as a motion picture camera. Further, the upper lens could be moveable with the lower lens in a fixed position. In addition, rather than include a manually adjustable arm for changing the slope of guide 55, one could include a keying device on the prime lenses. The lens system could include a mechanical or electromechanical sensing device for determining the focal length of the prime lenses based on the keying device, and adjust guide 55 appropriately. Accordingly, all such modifications are embodied within the scope of this patent as properly come within my contribution to the art and are particularly pointed out by the following claims.

I claim:
1. A lens system adapted to couple to a camera for recording images on film comprising:
   a first lens for receiving light;
   a second lens for receiving light;
   means for focusing said first and second lenses by moving said first lens in a direction along a first axis and moving said second lens in a direction along an axis parallel to said first axis; and vertical means for causing said second lens to move in a direction having a component along a second axis substantially perpendicular to said first axis in response to movement of said second lens along said first axis.

2. The lens system of claim 1 wherein the first lens and the second lens have equal focal lengths.

3. The lens system of claim 1 wherein said vertical means comprises:
a pin rigidity coupled to said second lens; and
a guide having a first surface, said pin being adapted to ride along said surface.

4. The lens system of claim 3 wherein said first surface is substantially flat.

5. The lens system of claim 4 further comprising pivot means for causing said guide to rotate about a third axis, said pivot means being rigidly coupled to said guide.

6. The lens system of claim 5 wherein said pivot means is manually adjustable.

7. The lens system of claim 6 further comprising means for moving said guide in a direction along said second axis.

8. The lens system of claim 7 wherein said lens system is adapted to couple to a motion picture camera.

9. The lens system of claim 7 wherein said lens system is adapted to couple to a still camera.

10. The lens system of claim 7 further comprising first reflecting means for reflecting light received by said first lens in a direction along a fourth axis substantially perpendicular to said first axis and said second axis.

11. The lens system of claim 10 further comprising second reflecting means for reflecting light received from said second lens in a direction along said fourth axis.

12. The lens system of claim 11 further comprising:
third reflecting means for reflecting light reflected by said first reflecting means in a direction along said first axis; and
fourth reflecting means for reflecting light reflected by said second reflecting means in a direction along said first axis.

13. The lens system of claim 12 further comprising means for receiving light reflected by said third and fourth reflecting means and focusing said received light on film.

14. The lens system of claim 10 further comprising means for moving said second lens in a direction along said fourth axis.

15. The lens system of claim 6 wherein said guide has a second surface substantially parallel to said first surface, said second surface being rigidly coupled to said first surface, said pin riding between said first surface and said second surface.

16. The lens system of claim 4 wherein the lens system is adapted to combine the image received by the first and second lenses in a single frame, the single frame being divided into a first portion and a second portion, the lens system being adapted to present the image received by the first lens in the first portion, the lens system being adapted to present the image received by the second lens to the second portion.

17. The lens system of claim 16 wherein the first surface has a slope proportional to the distance separating the centers of the first and second portions.

18. The lens system of claim 17 wherein the lens system is adapted to operate when the slope of the first surface is set as a function of the focal length of the first and second lenses.

19. A method for focusing a camera for recording images with a first lens and a second lens comprising the steps of:
focusing the camera on an object;
modifying the vertical displacement of the second lens relative to the first lens; and
adjusting a guide adapted to move the second lens along a vertical axis in response to horizontal motion of the second lens.

20. A method for focusing a camera for recording images with a first lens and a second lens comprising the steps of:
selecting the first and second lenses;
selecting an object to be filmed and a camera position said the object is to be filmed from;
modifying the vertical displacement of said second lens relative to said first lens; and
adjusting a guide adapted to move said second lens along a vertical axis in response to horizontal motion of said second lens.

21. A lens system adapted to couple to a camera for recording images on recording media, the recording media being adapted to store at least one frame, the lens system comprising:
a first prime lens for receiving light from an object;
a second prime lens for receiving light from the object, the second prime lens being displaced from the first prime lens in a direction having a component along a first axis and a second axis perpendicular to the first axis, the displacement along the first axis providing a three dimensional prospective when light received by the first and second lenses is viewed stereoscopically, the displacement along the second axis permitting the light received by the second prime lens and the light received by the first prime lens to be recorded on different portions of the one frame;
focusing means for moving the first and second prime lenses in a direction parallel to a third axis, the third axis being perpendicular to the first and second axes, the focusing means causing light received by the first and second prime lenses to be focused on the film;
means for presenting the image received from the first prime lens to a first portion of the frame and for presenting the image received from the second prime lens to a second portion of the frame; and
compensation means for causing displacement between the first and second prime lenses along the second axis to vary in response to motion of the second prime lens in a direction parallel to the third axis.

22. The lens system of claim 21 wherein the compensating means comprises a mechanical guide, the guide urging the second prime lens in a direction along second axis in response to motion of the second prime lens along the first axis.

23. The lens system of claim 21 further comprising a pin rigidly coupled to the second prime lens, the pin being adapted to travel along the mechanical guide, the guide urging the pin in a direction along the second axis in response to motion of the pin along the first axis.

24. The lens system of claim 23 wherein the pin extends in a direction parallel to the second axis, the mechanical guide having a slot adapted to receive the pin.

25. A stereoscopic lens system having a first prime lens and a second prime lens adapted to record stereoscopic images on film, the first and second prime lens being displaced along an axis, the displacement along the axis being adapted to cause the light from the first and second prime lenses to be recorded on different portions of the film, the lens system further comprising focusing means for focusing the lens system and compensation means for moving the second prime lens in a direction parallel to the axis in response to actuation of the focusing means.

* * * * *

UNITED STATES PATENT AND TRADEMARK OFFICE
CERTIFICATE OF CORRECTION

PATENT NO. : 4,525,045
DATED : June 25, 1985
INVENTOR(S) : Carl F. Fazekas

It is certified that error appears in the above—identified patent and that said Letters Patent is hereby corrected as shown below:

Column 3, line 2 change "strokes" to --strikes--.

Column 4, line 2 change "drawing" to --drawings--.

Column 5, line 4 after "displacement A" insert --(AA)--.

Column 7, line 10 (claim 3) change "rigidity" to --rigidly--.

Signed and Sealed this

Sixth Day of May 1986

[SEAL]

Attest:

DONALD J. QUIGG

Attesting Officer

Commissioner of Patents and Trademarks